United States Patent
Palm

(10) Patent No.: US 10,914,078 B2
(45) Date of Patent: Feb. 9, 2021

(54) FACADE FASTENING SYSTEM

(71) Applicant: SFS intec Holding AG, Heerbrugg (CH)

(72) Inventor: Erich Palm, Au (CH)

(73) Assignee: SFS intec Holding AG, Heerbrugg (CH)

( * ) Notice: Subject to any disclaimer, the term of this patent is extended or adjusted under 35 U.S.C. 154(b) by 0 days.

(21) Appl. No.: 16/272,247

(22) Filed: Feb. 11, 2019

(65) Prior Publication Data

US 2019/0301172 A1  Oct. 3, 2019

(30) Foreign Application Priority Data

Mar. 27, 2018  (EP) ...................................... 18164347

(51) Int. Cl.
*E04F 13/08* (2006.01)
*E04B 2/88* (2006.01)
(Continued)

(52) U.S. Cl.
CPC ............ *E04F 13/0857* (2013.01); *E04B 2/88* (2013.01); *E04F 13/081* (2013.01);
(Continued)

(58) Field of Classification Search
CPC . E04F 13/0857; E04F 13/081; E04F 13/0816; E04F 13/23; E04F 13/0808;
(Continued)

(56) References Cited

U.S. PATENT DOCUMENTS 4,035,093 A * 7/1977 Redshaw .............. F16B 5/0225
                                                       403/4
4,469,466 A * 9/1984 Hotz ................... E04F 13/0857
                                                     403/388
(Continued)

FOREIGN PATENT DOCUMENTS

DE    102008056970    5/2010
EP      0314120       5/1989
(Continued)

OTHER PUBLICATIONS

Machine translation for foreign reference FR2958956, obtained from https://patentscope.wipo.int/search/en/detail.jsf?docId=FR186938700&tab=PCTDESCRIPTION&_cid=P12-K4AGAP-28996-1 (last accessed on Dec. 19, 2019) (Year: 2019).*
(Continued)

*Primary Examiner* — Theodore V Adamos
(74) *Attorney, Agent, or Firm* — Volpe Koenig

(57) ABSTRACT

A fastening arrangement for anchoring facade panel elements includes a substructure on a building shell and a plurality of facade panel elements. The fastening arrangement has an adhesive component and a mechanical securing component. The fastening arrangement is characterized in that per facade panel element, at least two securing straps are provided as mechanical securing components, each having at least two fastening points. At least one fastening point of the two securing straps has a sliding point which uses an oblong hole. Furthermore, the longitudinal extent of this oblong hole defines an axis which is tilted at an angle γ of between 5° and 20° relative to the vertical axis. The fastening arrangement is constructed by preparing the substructure and at least one facade panel element for fastening, attaching the securing straps to the facade element and applying an adhesive component. After aligning and attaching the facade element to the substructure, the securing straps are attached (Continued)

to the substructure, with one attachment point of a first securing strap being the sliding point, and after fastening of the sliding point, the oblong hole is tilted at an angle γ of between 5° and 20° with respect to the vertical axis.

17 Claims, 3 Drawing Sheets

(51) Int. Cl.
*E04F 13/23* (2006.01)
*F16B 11/00* (2006.01)

(52) U.S. Cl.
CPC ...... *E04F 13/0816* (2013.01); *E04F 13/0885* (2013.01); *E04F 13/23* (2013.01); *F16B 11/006* (2013.01)

(58) Field of Classification Search
CPC ........ E04F 13/0885; E04B 2/965; E04B 2/88; F16B 5/0225; F16B 11/006
See application file for complete search history.

(56) References Cited

U.S. PATENT DOCUMENTS

| | | | | |
|---|---|---|---|---|
| 5,720,571 | A * | 2/1998 | Frobosilo | E04B 2/96 403/2 |
| 6,196,356 | B1 * | 3/2001 | Sneed | B66B 7/024 187/408 |
| 6,748,709 | B1 * | 6/2004 | Sherman | E04B 2/96 52/235 |
| 7,096,629 | B1 * | 8/2006 | Cox | E04F 13/0814 52/235 |
| 2004/0056167 | A1 * | 3/2004 | Vogt | F16B 5/0225 248/475.1 |
| 2005/0218277 | A1 * | 10/2005 | Shaw | E04G 13/00 248/201 |
| 2010/0154336 | A1 | 6/2010 | Wagner | |
| 2014/0020321 | A1 * | 1/2014 | Eklund | E04B 1/043 52/582.1 |
| 2014/0157699 | A1 * | 6/2014 | Moeller | E04B 2/88 52/235 |
| 2016/0305113 | A1 * | 10/2016 | Hatzinikolas | E04F 13/0801 |
| 2017/0204615 | A1 | 7/2017 | Gulnick | |

FOREIGN PATENT DOCUMENTS

| | | | | |
|---|---|---|---|---|
| EP | 0393210 | A1 * | 10/1990 | ........ E04F 13/0855 |
| EP | 2500490 | | 9/2012 | |
| FR | 2958956 | A1 * | 10/2011 | ........ E04F 13/0857 |
| FR | 2962316 | A1 * | 1/2012 | ........... F16B 5/0225 |
| WO | 2017077268 | | 5/2017 | |

OTHER PUBLICATIONS

Machine translation for foreign reference FR2962316, obtained from https://patentscope.wipo.int/search/en/detail.jsf?docId=FR186684435&tab=PCTDESCRIPTION&_cid=P12-K4CVC5-12263-1 (last accessed on Dec. 19, 2019) (Year: 2019).*
Machine translation for foreign reference EP0393210, obtained from https://patentscope.wipo.int/search/en/detail.jsf?docId=EP12077531&_cid=P12-K4CVDV-12531-1 (last accessed on Dec. 19, 2019) (Year: 2019).*
Machine translation of foreign reference FR2962316, obtained from https://patentscope.wipo.int/search/en/detail.jsf?docId=FR186684435&tab=PCTDESCRIPTION&_cid=P10-KFO0QJ-32946-1 (last accessed on Sep. 29, 2020) (Year: 2020).*

* cited by examiner

FACADE FASTENING SYSTEM

INCORPORATION BY REFERENCE

The following documents are incorporated herein by reference as if fully set forth: European Patent Application No. EP 18164347.9, filed Mar. 27, 2018.

FIELD OF THE INVENTION

The present invention refers to a system for fastening facades, more precisely: a curtain-wall system that allows a simpler and more economical installation with respect to the prior art.

BACKGROUND

Today, a building envelope is understood as the totality of all components that enclose a building to the outside. In modern residential and commercial buildings, this building envelope must fulfil a plurality of complex functions, as a barrier against precipitation, outside air, ambient temperature, noise and radiation. From a technical point of view, therefore, requirements of mechanical protection, thermal and acoustic insulation and an attractive design must all be achieved at the same time.

In this connection, the object of a curtain wall is to cover the functional layers and the shell surface of the building as the outer closure of the building envelope and to protect them from environmental influences. Thus, the assembly of the facade elements must be simple and safe, the anchoring must be able to withstand pressure and wind suction forces and meet the aesthetic requirements of the architecture.

PRIOR ART

In order to cover all the aforementioned requirements, a plurality of solutions have been described in the prior art. Usually, a distinction is made therein between a substructure and the outer facade shell. The substructure is usually a grid made of metal profiles, which is implemented at a predetermined distance from the underlying building shell. The facade panel elements that are visible from the outside are attached to this grid and together form the facade shell.

The requirements for such a combination of substructure and facade shell are high. The assembly should manage with few tools and elements, be flexibly applicable (building shape, different substrates of the shell) and should be capable of being implemented in a fast and cost-effective manner.

An assembled facade must be able to absorb or divert mechanical stresses caused by different expansions of the facade shell and substructure due to temperature changes. This means that either elastic elements are provided between the substructure and the facade shell to absorb the tensile/compressive stresses or a combination of fixed points and sliding points allows for play between the substructure and the facade shell.

Another frequent requirement is that the facade shell can be fastened "invisibly", i.e. that the mechanical connection points between facade elements and substructure do not appear externally.

It is known prior art to mechanically and permanently fasten facade panel elements using screws, rivets or suspension devices. However, depending on the size, condition and weight of such facade panel elements, a plurality of fixing points must be provided, which must be taken into account when designing the substructure.

Adhesive joints between the substructure and the facade elements therefore appear to be particularly attractive because they avoid drilling operations on the substructure during assembly. In addition, the load of the facade panel elements is transferred to the substructure over the entire surface rather than punctually. Due to the necessity of curing or setting an adhesive, it is also possible to adjust the final position of the elements within certain limits after the facade panels have been attached to the substructure. One advantage of adhesive bonding is that each facade panel is connected to the substructure over a large area and therefore swinging or rattling of the facade panels under changing wind loads occurs much less frequently.

However, modern adhesives must be processed under precisely controlled conditions, especially if they are to retain the required final strength over the long term. Pre-treatments such as cleaning (degreasing) and priming (adhesion promoter) of the substructure are complex and, if solvents are involved, problematic in handling, procurement and disposal. Processing temperatures below +5° C. and above +35° C. should generally be avoided; dew formation on the substructure and wetness caused by rain often prevent assembly. In addition, it may be necessary that such controlled conditions have to be fulfilled for several hours. Therefore, it is often necessary to provide temporary or permanent mechanical protection or additional quick bonding until the final strength is reached.

It is known, for example, to apply a double-sided adhesive tape to the substructure and a slower curing single-component or multi-component adhesive next to it. The adhesive tape often uses foam as backing material, which helps to compensate for unevenness in the substrate, can act as an elastic compensating material and defines a gap between the substructure and the facade panel element for the slower curing single or multi-component adhesive.

Clamps or clips can be used as temporary mechanical safety devices, which also ensure that, if necessary, the required contact forces are maintained during the setting/drying phase. Alternatively, brackets or other fastening elements can be provided which can provide fall protection during the setting phase and remain in place afterwards. These prior art temporary mechanical safety devices are designed to be as simple as possible because they only have to fulfil their safety function for a few hours. They are often designed as thin sheet metal components which are flatly attached (glued) to the back side of the facade panels during manufacture and allow screwing or riveting to the substructure. It may well be intended that after the final assembly of the facade panels by a single-/multi-component adhesive, the bonding area breaks open at some point—the mechanically strong connection as a fixed point is not suited to compensate for stress.

Against this background, a combination of an adhesive bond and mechanical securing appears to be a combination of the disadvantages of two systems in assembly, manufacture and provision of fasteners on the construction site.

SUMMARY

It is therefore an object of the invention to describe a fastening arrangement that overcomes this prejudice and the holding concept of which is therefore designed as a hybrid system with an adhesive component as well as a mechanical component, which is easy to assemble and to adjust and can be fastened invisibly. This is achieved by the combination of or more features described below and in the claims. A method is also provided which leads to a fastening arrangement having one or more features according to the invention.

In the following, "facade elements" or facade panels are to be understood as components that are to be fastened to a substructure as part of a building envelope. These facade elements are usually large, flat and have a square or rectangular basic shape. They are often made of metal, fiber cement, plastics, natural stone or composite materials. They serve to protect, insulate, board and/or decorate the building.

The term "substructure" is to be understood as the entirety of the mechanical components that form or can form a scaffold, a grid or a mechanical structure for the permanent support of facade panel elements. The substructure is anchored to the outer shell of a building. The building shell can also be an existing, earlier facade surface.

In this connection, fastening is described as being "invisible" if the facade panel elements, on their outwardly visible surface, do not show any elements that have anything to do with the attachment of the facade panel elements.

In the meaning of the present invention, a "strap" refers to a substantially flat piece of material with at least two through-holes, and which can be used to connect two components by screws, bolts and nuts, rivets or blind rivets.

A fastening arrangement according to the present invention is used for anchoring facade panel elements. It comprises a substructure on a building shell and a plurality of facade panel elements or facade elements 25, the fastening between the substructure and the facade panel elements comprising an adhesive component and a mechanical securing component. This is also the origin of the term hybrid system.

According to the invention, the fastening arrangement is characterized in that at least two securing straps 40, 42 are provided as mechanical securing components per facade panel element, each having at least two fastening points (e.g. 50, 52, 30, 32, 32'). One of the at least two fastening points will establish the connection between the strap and the facade panel element and the other or further fastening point will establish the connection between the strap and the substructure. It is possible to provide more than these two connection points per strap and still fulfil the function according to the present invention.

At least one attachment point of the first (40) of the two securing straps 40, 42 has a sliding point 50 which uses an oblong hole 41 of the strap. A fastening point within the scope of this invention comprises a connecting element (e.g. a screw-nut combination, a bolt, an expanding rivet), which forms the mechanical link between the strap and the facade panel or the strap and the substructure. The connecting element of the first fastening point can be passed through a through-hole in the securing strap and glued, screwed, spread, clamped or riveted into the facade panel. The through-hole in the strap can be an oblong hole or a circular through-hole. The connecting element of the second fastening point can be a drilling screw, a blind rivet or a comparable element, which is processed with an appropriate setting tool.

A sliding point exists when the strap and facade panel element or substructure can move relative to each other at the fastening point. If a fastening point only allows rotation, it is not a sliding point but a pivot point. However, a sliding point always has also the function of a pivot point. A sliding point thus offers a loose connection, in which, however, the strap and the facade panel element or substructure are captively connected by the connecting element. In order to be able to act as a sliding point, at least the strap, the facade element or the substructure must therefore have an oblong hole that allows a relative movement with respect to each other. The technically simplest and most reasonable way is to implement the oblong hole in the strap. The connecting element in turn must be designed or set in such a way that it permits the required relative movement, e.g. by means of a screw with a spacer sleeve pushed thereon. A fixed point thus represents a fastening point that holds the strap and the facade panel element or substructure immovably in place.

Furthermore, it is important for the invention that in an assembled fastening arrangement having a strap with a sliding point, the oblong hole does not extend purely vertically or purely horizontally. For this purpose, an axis A is considered which is defined by the longitudinal extent of the oblong hole in the plane of the strap. According to the invention, in the installed state of the strap, this axis A is tilted against the vertical at an angle $\gamma$. For $\gamma$, a value between 5° and 20°, preferably 5° to 10°, is used. The reference axis or vertical axis V, which serves as reference, can be determined by a perpendicular.

This tilting can preferably be achieved by installing a strap, the longitudinal extent of which runs parallel to the axis A of one of its oblong holes, at an angle, i.e. tilted at the angle $\gamma$, as shown in FIG. 3. Alternatively, it is possible to use a strap which can be installed vertically, the oblong hole of which, however, has a tilted arrangement relative to the longitudinal extent of the strap.

This tilting angle has the effect that the sliding point can accommodate both horizontal and vertical dimensional changes of the facade panel element 25 and the substructure 22, 22' and thus helps to avoid stress in the facade construction. At the same time, the effect of the straps, which serve as a safety device if the adhesive bond fails, is not impaired. In this case, it makes no difference that the sliding point cannot hold the facade panel in its original position; slippage is possible depending on the type of installation. However, as this is an emergency safety device, this is uncritical.

A short steel cable with eyelets at both ends could serve as a technical equivalent for a securing strap, wherein the steel cable ensures sliding point properties, even if the two eyelets are anchored as fixed points.

In a further refinement of the invention, a securing strap 40, 42 in a fastening arrangement can be formed as a flat, substantially T-shaped strap element 12, double-T-shaped strap element 12", L-shaped strap element 12' or I-shaped strap element 11, 11'. "Flat" is not meant as a definition of an exclusively flat component. It is quite possible that a strap element includes reinforcements incorporated into the surface, such as beads or bends or bulges.

The different types of strap elements described can be used together (next to each other) where this appears to be technically reasonable. It is rational and preferred if the first and second securing straps 40, 42 are of the same type of strap element. The strap elements are preferably made of steel, aluminum or high-strength plastics, in particular fiber-reinforced plastics.

As mentioned at the beginning, the present invention is a hybrid system consisting of a mechanical securing component and an adhesive component. As an adhesive component, at least one or a combination of the following elements can be considered: single- or multi-component adhesive, double-sided adhesive tape, double-sided foam adhesive tape, double-sided adhesive dots or strips.

The substructure, as with known adhesive facade systems, is preferably formed by vertically arranged profiles, which can be made in a known manner from metal as L-, U- or flat profiles. The vertical arrangement has advantages with respect to the available adhesive surface as well as for the use of securing straps presented here.

The structure of a fastening arrangement according to the invention can be described as a sequence of method steps. A method for fastening facade panel elements 25 to a substructure 22, 22' would comprise at least the following steps:

a) Providing a substructure 22, 22'.

b) Providing at least one facade panel element 25.

c) Preparing the substructure 22, 22' and the facade panel element for fastening.

d) Attaching at least two securing straps to the facade element 25. Attaching preferably comprises adhesive bonding, screwing, riveting or clamping the securing straps.

e) Applying at least one adhesive component onto the facade element 25 or the substructure 22, 22'. Depending on the specific case of application, this can involve applying a single- or multi-component adhesive, attaching a double-sided adhesive tape or double-sided foam adhesive tape, double-sided adhesive dots or strips.

f) Aligning and attaching the facade element to the substructure 20, 22'. This comprises in particular:

Positioning the facade panel element horizontally and vertically according to a laying plan.

Bringing the surfaces to be bonded or the adhesive components applied into contact with each other.

If necessary, fine adjustment of the alignment of the facade panel element 25.

If necessary, attaching clamps, cramps or clips to secure the aligned facade panel element 25.

g) Fastening the two securing straps to the substructure, wherein a fastening point of the first 40 of the two securing straps 40, 42 is a sliding point 50. This sliding point uses an oblong hole 41, the longitudinal extent of which defines an axis (A) which, after the sliding point has been fastened, is tilted at an angle γ of between 5° and 20° with respect to the vertical axis (V). Fastening comprises, in particular, screwing or riveting.

"Preparing", as described in step c), means in particular:

Checking and, if necessary, cleaning at least partial surfaces of the substructure 22, 22' and/or the facade panel element 25. The substructure is usually soiled after setting up the substructure and performing drilling and screwing work. In the areas intended for adhesive bonding (partial surfaces), cleaning using mechanical means (roughening) or chemical means (solvents) may therefore be advisable.

If necessary, applying an adhesion promoter/primer. Certain adhesives require the use of an adhesion promoter to be applied onto the (pre-cleaned) surface intended for bonding.

Steps c) and d) above do not necessarily have to be performed in the order described above. It may make sense to deliver the facade panel elements to the installation site already equipped with securing straps. It may be that the preparation step c) is carried out parallel to the assembly of other facade panel elements. Therefore, the basic principle applies that the description and sequence in the claims must not to be understood as being limited to a strictly chronological sequence. As a method variant is to be considered if the steps or partial steps of c) and d) are carried out in a changed sequence.

In order to facilitate assembly, one or more distance gauges 60, which support the alignment and attachment of the additional facade panel element 25, can be fitted before attaching an additional facade panel element in accordance with steps a) to g). Such a spacer element can be used as a simple spacer block with a predetermined height. After assembly of a facade panel element, the spacer elements are placed or slipped thereon and allow the next spacer element to be placed on top. As a result, simpler and more precise positioning of the facade panel element can be ensured. After curing of the adhesive bond, the distance gauges are removed again and can be used again.

DETAILED DESCRIPTION

Figure 1:
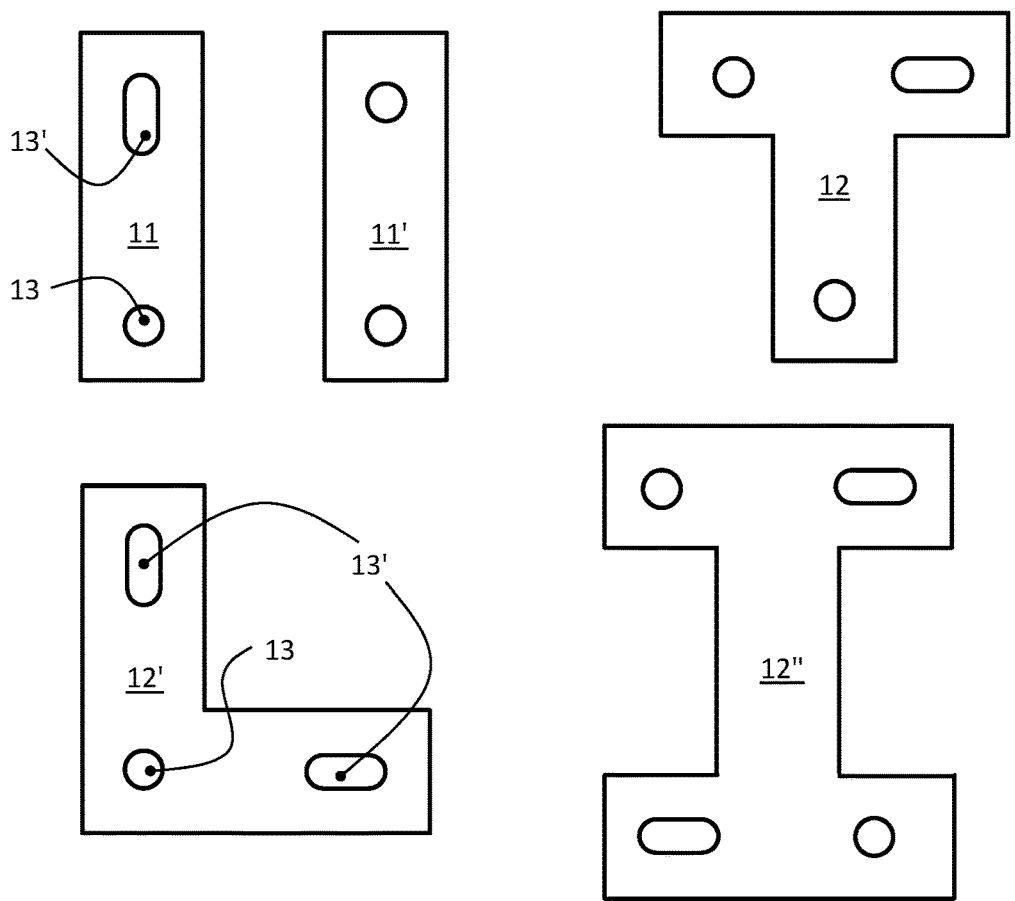
FIG. 1 shows an overview (not conclusive) of possible strap elements.

FIG. 1 shows various embodiments of securing straps as they can be used in a fastening arrangement according to the invention. The reference signs 11, 11' designate two simple, I-shaped straps with two through-holes 13, 13', wherein 11 designates a through-hole configured as an oblong hole 13'. Embodiment 11' does not allow a sliding point due to the two circular through-holes. Embodiment 11 allows a sliding point in the oblong hole 13', provided that the connecting element (screw, rivet, . . . ) allows a loose connection. A screw connection through an oblong hole, e.g., can be a fixed point if the screw in the oblong hole 13' connects the strap 11 rigidly enough that a relative movement is excluded. Reference sign 12 designates a T-shaped strap and reference 12' an L-shaped strap element with 2 oblong holes 13'. The double-T-shaped strap element 12" has two oblong holes. An expert will select or adapt the provision with oblong holes depending on the type of facade panel and substructure. The variants shown are not a final selection but merely exemplary representations. Technically possible details such as beads or reinforcing embossments are not illustrated.

Figure 2:
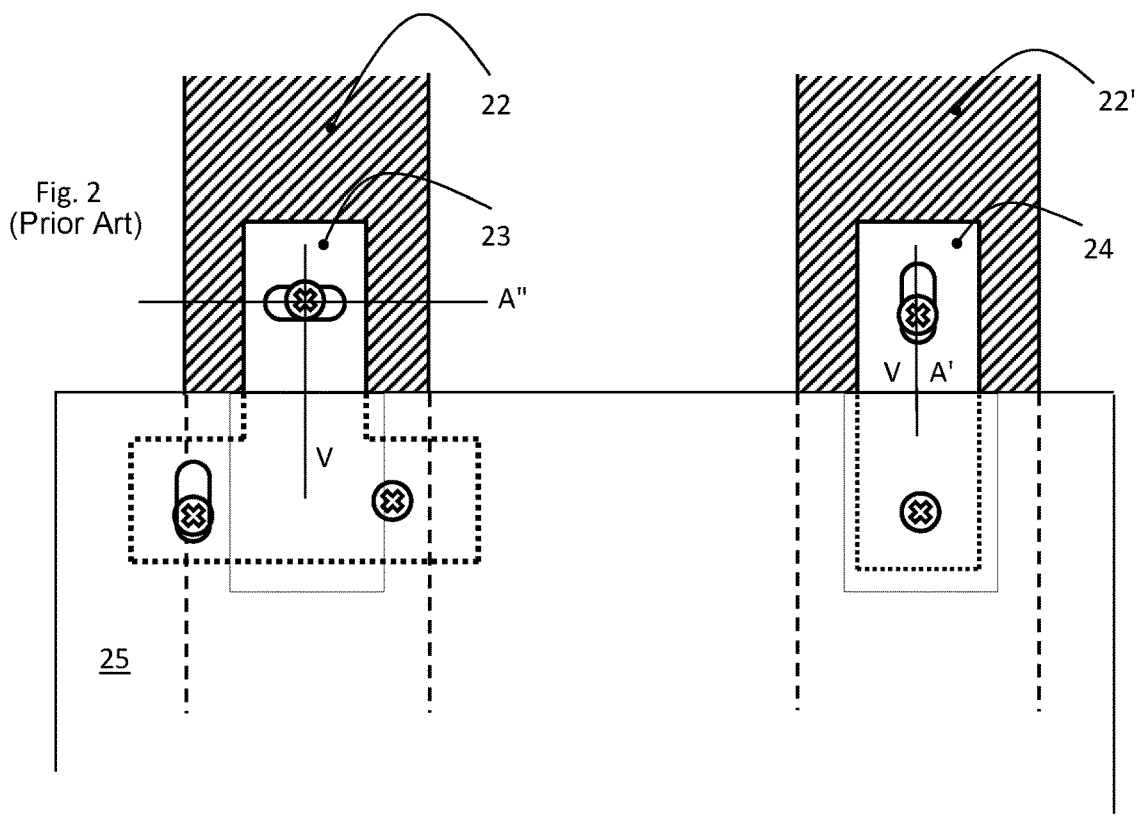
FIG. 2 shows a fastening arrangement with sliding point (s), but not according to the invention.

FIG. 2 shows a fastening arrangement with 2 straps 23, 24 according to the prior art. They are presented here in order to better define the invention. The substructure is again designated by 22, 22' and is shown as a vertical profile to which a facade panel element 25 has been fastened. Two straps 23, 24 of different shapes are used to complete the fastening arrangement. The top of strap 23 shows an oblong hole with horizontal orientation; the orientation axis is designated by "A". Analogously, the strap 24 has a vertically oriented oblong hole, the orientation axis of which is designated by A'. The fastening arrangement shown in FIG. 2 comprises oblong holes of different orientation and can represent a sliding point or a fixed point, depending on the connecting element used. The absence of the feature "axis A tilted at an angle γ to the vertical" means that the fastening arrangement of FIG. 2 is, however, not an embodiment according to the invention. In case of the strap 23, the orientation of axis "A" and the vertical V define an angle of 90°. In the case of strap 24, the angle between V and A' is substantially 0.

Figure 3:
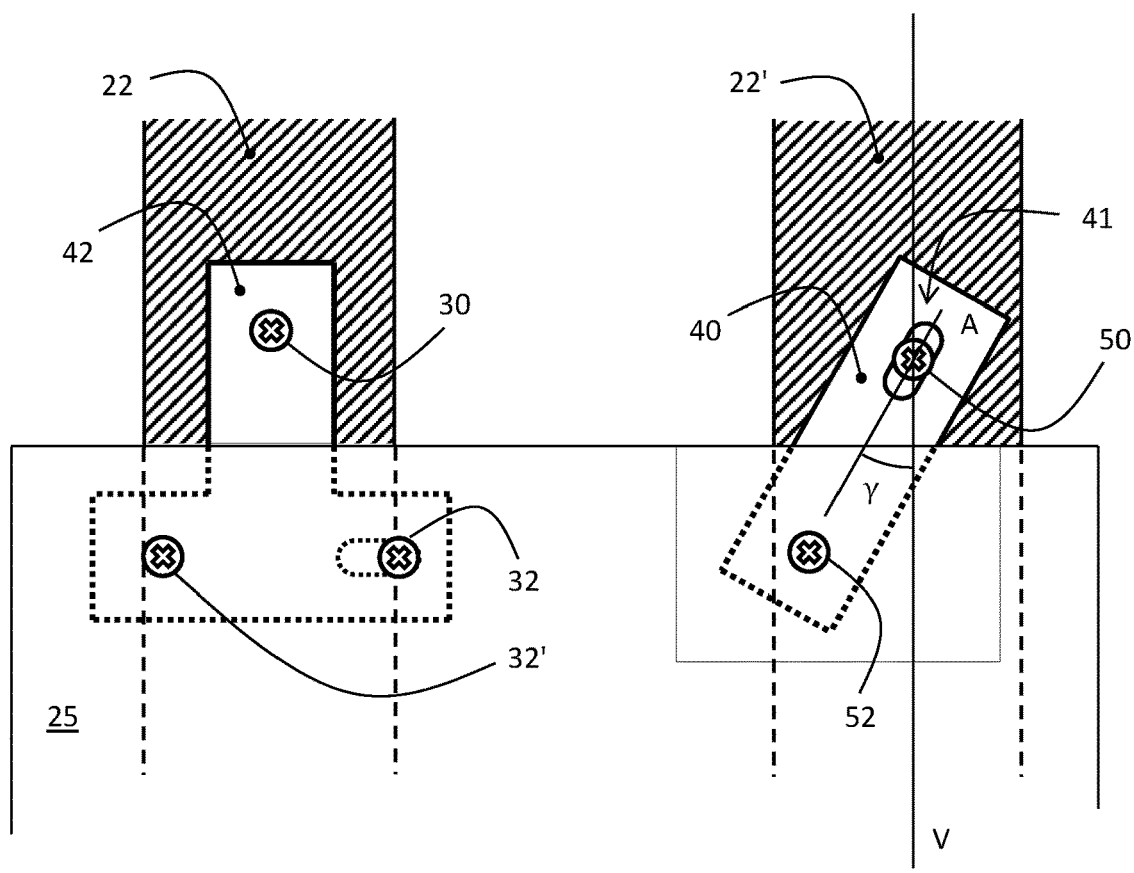
FIG. 3 shows a fastening arrangement according to the invention.

In contrast to this, the fastening arrangement according to FIG. 3 represents an embodiment according to the invention. The left side of FIG. 3 is basically comparable to the left side of FIG. 2. The strap 42 has a fastening point 30 with the profile 22 of a substructure. Here, since the strap has no oblong hole, it is a fixed point or pivot point rather than a sliding point. The connection between the securing strap 42 and the facade panel element 25 includes two fixing points 32, 32'. The fastening point 32' is a fixed point; the fastening point 32 has an oblong hole; however, its horizontal orientation does not make it a sliding point in the sense of the invention.

This is different in the case of the securing strap 40, which likewise connects a profile 22' of the substructure to the facade panel element 25. This strap 40 has an oblong hole 41, the orientation of which, designated by the axis A in FIG. 3, is tilted at an angle γ to the vertical V. According to the invention, the fastening point 50 is a sliding point; thus, this connection is able to compensate for thermal expansions of the substructure or facade panel. The second fastening point 52 of the securing strap 22' is preferably configured as a fixed point.

Figure 4:
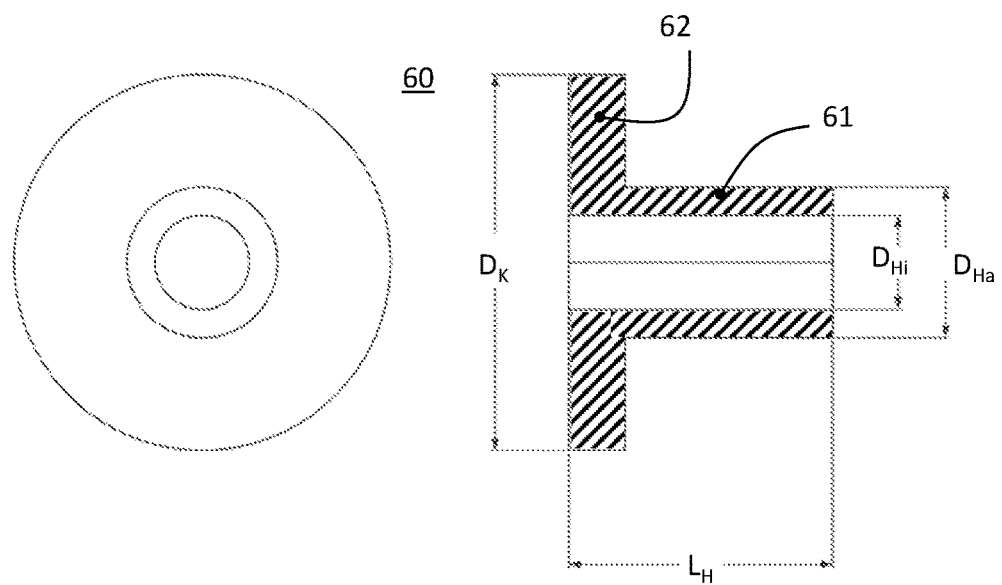
FIG. 4 shows a possible embodiment of a spacer element.

FIG. 4 shows a distance gauge or sleeve 60, which can be used for assembling facade panel elements 25. It preferably has a T-shape or mushroom-shape with a flat head 62 in cross-section. A tubular sleeve 61 has an outer diameter $D_{HA}$, which defines the nominal distance between two facade panel elements 25 during assembly. The head 62 or flange on the sleeve 61 with diameter $D_K$ serves as a limit stop; for details see FIG. 5. The sleeve can be configured as a solid rod or can be tubular with a free inner diameter DHI. In addition to saving material, the opening can also serve as an engagement point for a setting tool or an auxiliary handle for removing the distance gauge 60 after assembly.

Figure 5:
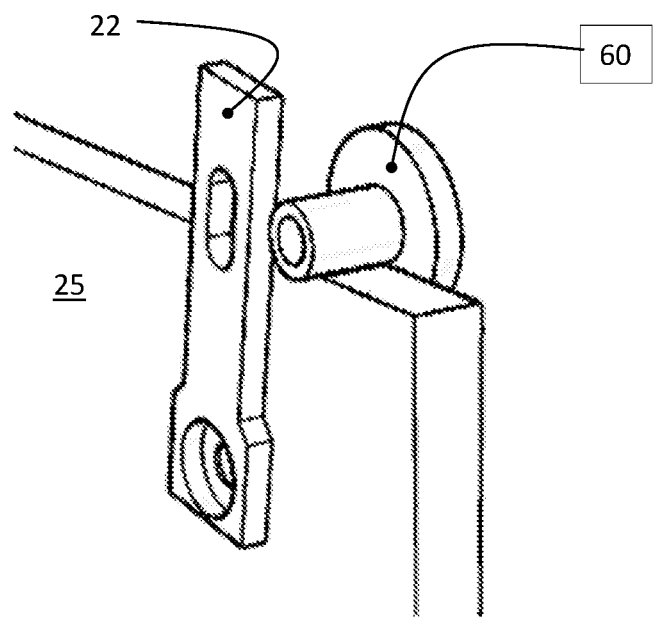
FIG. 5 shows a rear view of a schematic assembly for a fastening arrangement.

FIG. 5 shows an assembly situation from the building side with a view to the rear side of a facade element 25. A strap 22 (without connecting elements) is covered on the rear side of the facade element and a distance gauge 60 marks the nominal distance to the next facade element to be assembled.

The features of the invention disclosed in the above description, in the drawings and in the claims can be essential for the implementation of the invention, either individually or in any combination that is technically reasonable or advantageous.

REFERENCE LIST

11, 11' Strap element, securing strap I-shaped
12 Strap element, securing strap T-shaped
12' Strap element, securing strap L-shaped
12" Strap element, securing strap double T-shaped
13, 13' Through-holes
20 Fastening arrangement, holding system
22, 22' Subconstruction
25 Facade panel element, facade element
30, 32, 32' Fastening points
41 Oblong hole
40, 42 Securing strap(s)
50 Fastening point oblong hole
52 Fastening point
60 Distance gauge
61 Sleeve
62 Head

The invention claimed is:

1. A fastening arrangement, comprising:
   a substructure on a building shell;
   a plurality of facade panel elements or facade elements;
   an adhesive component and a mechanical securing component located between the substructure and the facade panel elements or facade elements, the adhesive component forming an adhesive joint between the plurality of facade panel elements or facade elements and the substructure;
   the mechanical securing component including at least two securing straps per facade panel element or facade element, the at least two securing straps each including at least two fastening points, one of the fastening points being connected to a respective one of the facade panel elements or facade elements and the other of the fastening points being connected to the substructure;
   at least one of said fastening points of a first of the at least two securing straps is a sliding point that comprises a completely bounded oblong hole; and
   a longitudinal extent of the oblong hole defines an axis (A) that is tilted at an angle γ of between 5° and 20° with respect to a vertical axis (V) and coincides with a longitudinal axis of the first of the two securing straps.

2. The fastening arrangement according to claim 1, at least one of the securing straps is formed as a flat, substantially T-shaped strap element, a double-T shaped strap element, an L-shaped strap element, or an I-shaped strap element.

3. The fastening arrangement according to claim 2, wherein at least first and second ones of the securing straps have an identical construction.

4. The fastening arrangement according to claim 1, wherein the straps are formed from steel, aluminum or high-strength plastics.

5. The fastening arrangement according to claim 1, wherein the adhesive component comprises at least one of the following: single- or multi-component adhesive, double-sided adhesive tape, double-sided foam adhesive tape, double-sided adhesive dots, or double-sided adhesive strips.

6. The fastening arrangement according to claim 1, wherein the substructure comprises vertically arranged profiles.

7. The fastening arrangement according to claim 6, wherein the vertically arranged profiles are configured as L-, U- or flat profiles made from metal.

8. A method for fastening façade panel elements or façade elements to a substructure, the method comprising:
   a) providing a substructure on a building shell;
   b) providing a plurality of façade panel elements or façade elements;
   c) preparing the substructure and the plurality of façade panel elements or façade elements for fastening;
   d) attaching at least two securing straps to each façade panel element or façade element;
   e) applying at least one adhesive component onto each façade panel element or façade element or the substructure;
   f) aligning and attaching each façade panel element or façade element to the substructure; and
   g) fastening the at least two securing straps to the substructure, wherein each securing strap includes at least two fastening points, wherein for each securing strap, one of the fastening points is connected to a respective one of the façade panel elements or façade elements and the other of the fastening points is connected to the substructure, wherein at least one of said fastening points of a first one of the at least two securing straps is a sliding point which uses a completely bounded oblong hole, a longitudinal extent of which defines an axis (A) which, after fastening at the sliding point, is tilted at an angle γ between 5° and 20° with respect to a vertical axis (V) and coincides with a longitudinal axis of the first of the two securing straps.

9. The method according to claim 8, wherein step c) comprises:

cleaning at least partial surfaces of at least one of the substructure or the façade panel elements or façade elements.

10. The method according to claim 9, wherein step c) further comprises:
applying an adhesion promoter/primer.

11. The method according to claim 8, wherein the attaching in step d) comprises adhering, screwing, riveting, clamping the securing straps to the façade panel elements or façade elements.

12. The method according to claim 8, wherein the applying of the adhesive component in step e) comprises at least one of the following steps: applying a single- or multi-component adhesive, attaching a double-sided adhesive tape, attaching a double-sided foam adhesive tape, double-sided adhesive dots or strips.

13. The method according to claim 8, wherein the step c) is carried out after step d).

14. The method according to claim 8, wherein the fastening in step g) comprises screwing or riveting.

15. The method according to claim 8, wherein the aligning and attaching of the façade panel elements or façade elements according to step f) comprises:
positioning the façade panel elements or façade elements horizontally and vertically according to a laying plan; and
bringing at least one of surfaces to be bonded or adhesive components applied into contact with each other.

16. The method according to claim 15, wherein the aligning and attaching of the façade panel elements or façade elements according to step f) further comprises at least one of:
fine adjustment of the alignment of the façade panel elements or façade elements; or
attaching clamps, cramps, or clips for securing the aligned façade panel elements or façade elements.

17. The method according to claim 8, further comprising prior to fastening a further façade panel element or façade element according to steps a) to g), attaching of one or more distance gauges, which support an alignment and attachment of the further façade panel element or façade element.

* * * * *